United States Patent [19]
Bittner

[11] Patent Number: 5,585,124
[45] Date of Patent: Dec. 17, 1996

[54] QUILL SHAFTED PELLET MILL

[75] Inventor: Oszkar Bittner, Muncy, Pa.

[73] Assignee: Andritz Sprout-Bauer, Inc., Muncy, Pa.

[21] Appl. No.: 365,895

[22] Filed: Dec. 29, 1994

[51] Int. Cl.$^6$ ..................................................... B29B 9/00
[52] U.S. Cl. ........................ 425/331; 264/118; 264/140; 425/202; 425/DIG. 101; 425/DIG. 230
[58] Field of Search ......................... 425/331, DIG. 230, 425/DIG. 101, 202, 308, 310; 264/118, 140

[56]  References Cited

U.S. PATENT DOCUMENTS

| | | | |
|---|---|---|---|
| 2,764,951 | 10/1956 | Fisher | 425/331 |
| 2,798,444 | 7/1957 | Meakin | 425/DIG. 230 |
| 2,981,212 | 4/1961 | Landers | 425/331 |
| 3,139,844 | 7/1964 | Landers | 425/DIG. 230 |
| 3,354,845 | 11/1967 | Schultz | 425/331 |
| 3,779,619 | 12/1973 | Van Dorn et al. | 308/72 |
| 3,825,387 | 7/1974 | Gilman | 425/331 |
| 3,981,664 | 9/1976 | Bittner et al. | 425/331 |
| 4,111,632 | 9/1978 | Leaver | 125/382 R |
| 4,854,720 | 8/1989 | Schold | 366/294 |

FOREIGN PATENT DOCUMENTS

| | | | |
|---|---|---|---|
| 0039961 | 11/1981 | European Pat. Off. | 425/331 |
| 0043019 | 1/1982 | European Pat. Off. | 425/331 |
| 8102245 | 12/1982 | Netherlands | 425/331 |
| 1018858 | 5/1983 | U.S.S.R. | 425/331 |

OTHER PUBLICATIONS

Andritz Sprout-Bauer, Brochure No. 5000. Dated: Jan. 1992.

*Primary Examiner*—Jay H. Woo
*Assistant Examiner*—Duane S. Smith
*Attorney, Agent, or Firm*—Chilton, Alix & Van Kirk

[57] ABSTRACT

The present invention employs a main shaft cantilevered from a frame. A die holder is disposed around the outside of the shaft, and in the preferred embodiment rotates by the use of adjustable tapered roller bearings around the shaft. Fixed to the die holder is a die, and the die and die holder define a pelletizing chamber. The shaft supports a roller frame with a plurality of rollers within the pelletizing chamber. The resulting construction is a pelletizer shaft support structure that uses only a single set of bearings. In the preferred embodiment, the main shaft is comprised of an inner shaft and an outer shaft. The inner shaft is located coaxially within the outer shaft and supported within the outer shaft by static bushings. The roller frame and rollers are mounted to the inner shaft. The inner shaft and the outer shaft are both fixed to the frame structure. The outer shaft is fixed in a permanent manner while the inner shaft is fixed to the frame by use of a shear pin to allow rotation under emergency circumstances. During operation of the mill, should binding of the roller mechanism in relation to the die result in undue torque being placed upon the inner shaft, the shear pin will shear and allow the inner shaft and the outer shaft to rotate relative to each other to protect the mechanism from further damage.

10 Claims, 2 Drawing Sheets

5,585,124

QUILL SHAFTED PELLET MILL

BACKGROUND OF THE INVENTION

This invention relates to pellet mills, in particular, the shaft and bearing support for roller pelletizers.

In a conventional pellet mill, such as described in U.S. Pat. No. 3,981,664, "Main Shaft Support For Pellet Mills", a main shaft has one end which supports a roller frame. The roller frame rotatably holds a plurality of rollers. Disposed around the outside of the roller frame and rollers is an annular die holder having a replaceable die. The die is supported in such a manner as to be in intimate contact with the rollers on the roller frame. The die holder surrounds the shaft and is supported by bearings for rotation relative to the shaft. Coaxially disposed around the shaft and the die holder is a main frame structure, or casing. The die holder is allowed to rotate relative to this frame structure by the use of a second set of bearings. The end of the main shaft not supporting the roller frame extends beyond the die holder and is fixed relative to the main frame. Therefore, the die holder rotates relative to the shaft and the main frame, but the shaft and main frame are fixed relative to each other.

The die and die holder define a pelletizing chamber within which the rollers and roller frame are stationed. Viscous solid feed material, such as animal feed products, previously conditioned by an extruder, are introduced into this pelletizing chamber. The pelletizer operates by employing a motor to rotate the die holder and therefore the die. The rollers ride along the inside surface of the die and rotate due to the rotation of the die itself, but have no independent means of rotation. Feed material is trapped between the rotating rollers and the rotating die and extruded through radially disposed slots in the die. Once the feed material has been forced through the slots in the die, knives or other means outside of the die shear the feed material from the die to form pellets. The cut pellets are then deposited in and collected from a housing surrounding the mill.

Conventional pellet mills require at least two sets of roller bearings to allow relative rotation between the die holder and the frame, and between the die holder and the shaft. Accommodating two sets of bearings, each with its own tolerance limits, gives rise to noticeable vibration. These bearings are also subject to high stresses and require lubrication while located within the complicated structures of the mill. The main shaft must also be of sufficient robust construction so as to be able to resist bending, torsion and shear forces as a result of the rotation of the die on the outside of the rollers. Additionally, the main shaft must support the weight of all of the components. The result of all these forces is decreased bearing life, and stresses that can exceed the limits of the bearings leading to their failure.

SUMMARY OF THE INVENTION

It is accordingly a first object of this novel invention to provide a means of supporting a pelletizer mill with a reduced number of required bearings.

It is another object of the present invention to provide a method of supporting a pelletizer mill that employs bearings better able to withstand the stresses of such an apparatus and have a longer operating life.

It is yet another object of the invention to provide a support shaft for a pelletizer mill that will divide the support weight functions and the torsion resistant functions between two separate shafts.

It is still another object of the invention to provide a shaft support that allows a higher operating speed for a pelletizer.

It is a further object of the invention to provide a shaft mechanism for a pelletizer that under normal operation has only a single shaft rotating relative to the die and die holder.

These and other objects are provided by the present invention which employs a main shaft cantilevered from a frame. A die holder is disposed around the outside of the shaft, and in the preferred embodiment rotates by the use of adjustable tapered roller bearings around the shaft. Fixed to the die holder is a die, and the die and die holder define a pelletizing chamber. The shaft supports a roller frame with a plurality of rollers within the pelletizing chamber. The resulting construction is a pelletizer shaft support structure that uses only a single set of bearings.

In the preferred embodiment, the main shaft is comprised of an inner shaft and an outer shaft. The inner shaft is located coaxially within the outer shaft and supported within the outer shaft by means of static bushings. The roller frame and rollers are mounted to the inner shaft. The inner shaft and the outer shaft are both fixed to the frame structure. The outer shaft is fixed in a permanent manner while the inner shaft is fixed to the frame by use of a shear pin to allow rotation under emergency circumstances. During operation of the mill, should binding of the roller mechanism in relation to the die result in undue torque being placed upon the inner shaft, the shear pin will shear and allow the inner shaft and the outer shaft to rotate relative to each other to protect the mechanism from further damage.

Because the inner shaft and outer shaft generally, during proper operation of the pelletizer, do not rotate relative to one another, PTFE-composite bushings may be used between the inner and outer shafts. These bushings, specifically designed for static loads, are better able to withstand the heat and stresses of operation of the pelletizer mill. The bushings are superior to conventional types of roller bearing used if the two shafts are allowed to rotate relative to one another during normal pelletizer operation.

Additionally, because of the two coaxial shaft design, the outer shaft can be specifically constructed to support the weight of the die and die holder. The inner shaft can be independently designed to resist and compensate for the torque induced on the inner shaft as a result of the rollers contacting the inside surface of the die. The distribution of rotational and gravitational stresses between the inner and outer shaft results in a superior pelletizer structure because each shaft may be more specifically designed for a particular type of stress.

The advantage of a single set of bearings is that all slack in the system can be taken up by adjustment of the single set of bearings. Tolerances in the pelletizer can be tighter because there is no requirement to compensate for multiple sets of bearings. A limitation on the operation of present pelletizers is that the natural frequency of the pelletizer limits the operating speed and type of material to be pelletized. Tighter tolerances increase the natural frequency of the pelletizer, therefore increasing operating speed and the kinds of material that can be processed.

BRIEF DESCRIPTION OF THE DRAWINGS

These and other advantages of the invention will become more evident from the following description of the preferred embodiments and accompanying drawings in which.

DESCRIPTION OF THE PREFERRED EMBODIMENT

Figure 1:
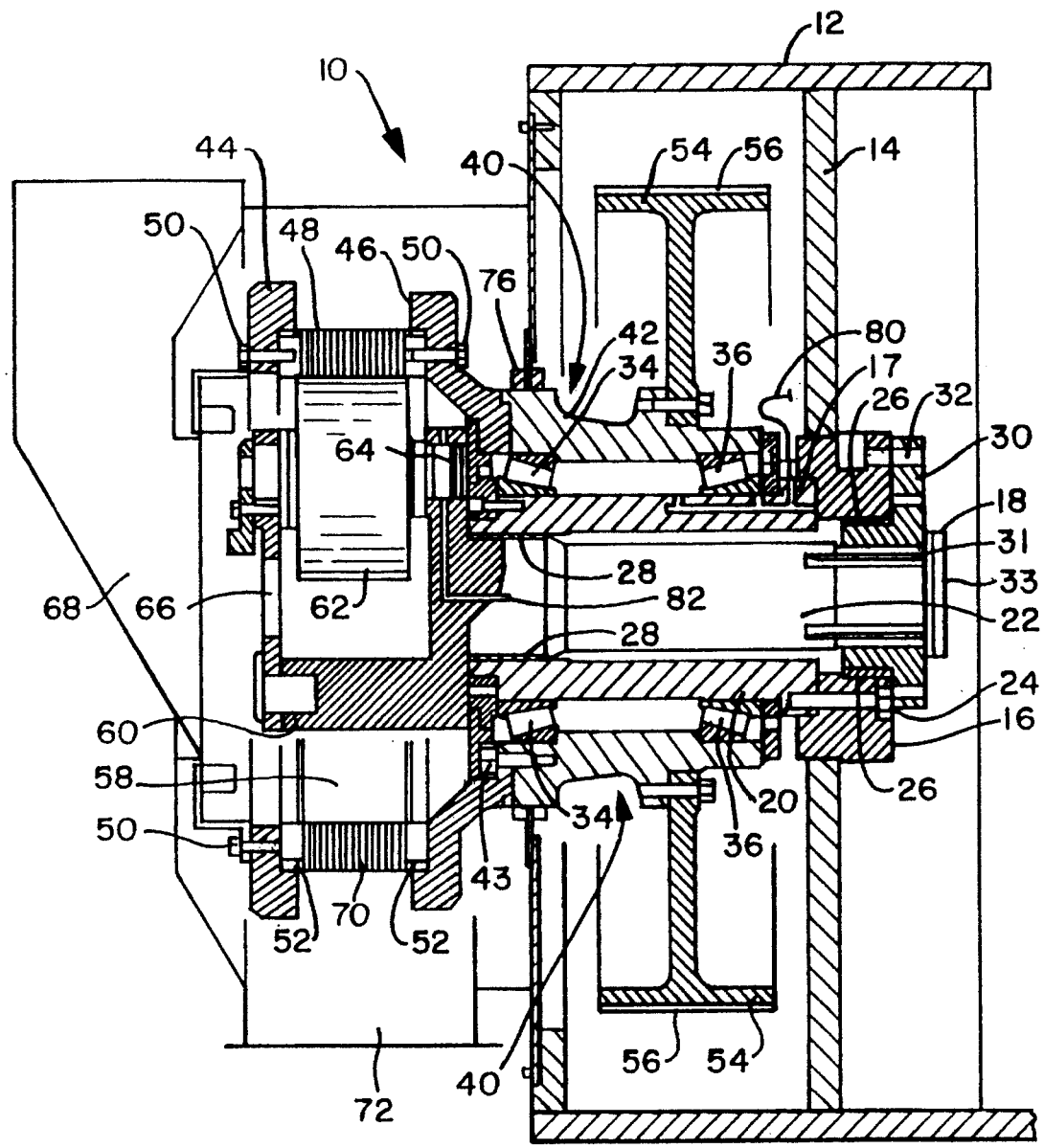
FIG. 1 is partial sectional view of the preferred embodiment of a coaxial main shaft pelletizer.

Wherein like parts are denoted by the same numerical identifiers throughout the figures, the pelletizer of the invention is generally shown at 10 in FIG. 1. The pelletizer 10 has for structural support of the other pelletizer components a main frame or casing 12. The main frame has a main support wall 14 that is of sufficient strength to allow the components of the pelletizer to be cantilevered from the main frame 12. Fixed to the main support wall 14 is a shaft mount or hub 16 which defines a generally horizontal main rotation axis. Fixed to the shaft mount 16 is a main shaft structure 18 comprised of a tubular outer shaft 20 and a coaxial inner shaft 22. The outer shaft 20, which can be described as a "quill shaft", is attached to shaft mount 16 by the use of bolts 24. The outer shaft 20 fits into an annular step or shoulder 17 on the shaft mount 16, which is welded to the main frame. The strength of the connection of the outer shaft and shaft mount are of significant importance to the overall structure of the pelletizer 10. The quill shaft 20 carries a significant portion of all the weight of the pelletizer. The quill shaft 20 transfers this weight to the main frame 12 at the step 17 because the shaft 20 is cantilevered from the main frame 12. The outer shaft 20, shaft mount 16 and main frame 12 function as a unitary structure in the preferred embodiment. The inner shaft 22 and outer shaft 20 are held in radially spaced apart relation to each other by use of a pair of axially spaced bushings 26, 28.

In the preferred embodiment, the bushings 26, 28 are constructed of a PTFE-composite. The result of employing a PTFE-composite is a static journal bearing that is better able to withstand the stresses of pelletizer operation than more conventional radial roller or tapered roller bearings. These PTFE-composite bushings 26, 28 are capable of handling five to ten times more static load than conventional rotating anti-friction bearings. PTFE-composite bushings are able to withstand 30,000 psi of dynamic high load capacity, compared to 6,000 psi for a conventional bronze bushing. In addition, PTFE-composite bearings can withstand higher temperatures, up to 500° F., versus 230° F. for a conventional bronze bushing. Also, these PTFE-composite bushings can absorb vibrations and shocks that would damage metal bushings. Furthermore, PTFE-composite bushings are not subject to galvanic, chemical and fretting corrosion. The result is a decrease in the occurrence of bearing seizure. Due to the self-lubricating nature of the PTFE fibers wound in the bushings 26, 28, complex lubrication systems are not required to maintain the bushings in operating condition. Quieter operation of the pelletizer results from the use of PTFE-composite bushings because of the lack of metal-to-metal contact that occurs in a conventional metal bushing.

The bearings 26, 28 are not designed for continuous rotation under the normal operating regime of the pelletizer. The bearings only come into use to avoid catastrophic failure of the pelletizer, i.e., allowing rotation between the inner and outer shafts to reduce the extent of damage to the apparatus.

Fixed to the proximal end of inner shaft 22 is shaft cap 30. The shaft 22 is fixed to a cylindrical portion of the shaft cap 30 by means of key ways 30 on the inner shaft 22 into which corresponding keys on the shaft cap 30 fit. The shaft and shaft cap then function as a unitary component. Additionally, a lock plate 33 fits onto the end of shaft 30 to resist lateral motion. Shaft cap 30 has a flanged portion by which shear pins 32 fix the inner shaft in relation to the shaft mount 16. Should the inner shaft experience greater torque than a preset amount, e.g., due to binding between the rollers and the die, the shear pins 32 will shear allowing the inner shaft 22 and cap 30 to rotate. The inner shaft 22 rotates relative to the main support wall 14 and the shaft mount 16, on the PTFE-composite bearings 26, 28. In the preferred embodiment, the bearing 26 is disposed between the shaft cap 30 and the shaft mount 16.

Figure 2:
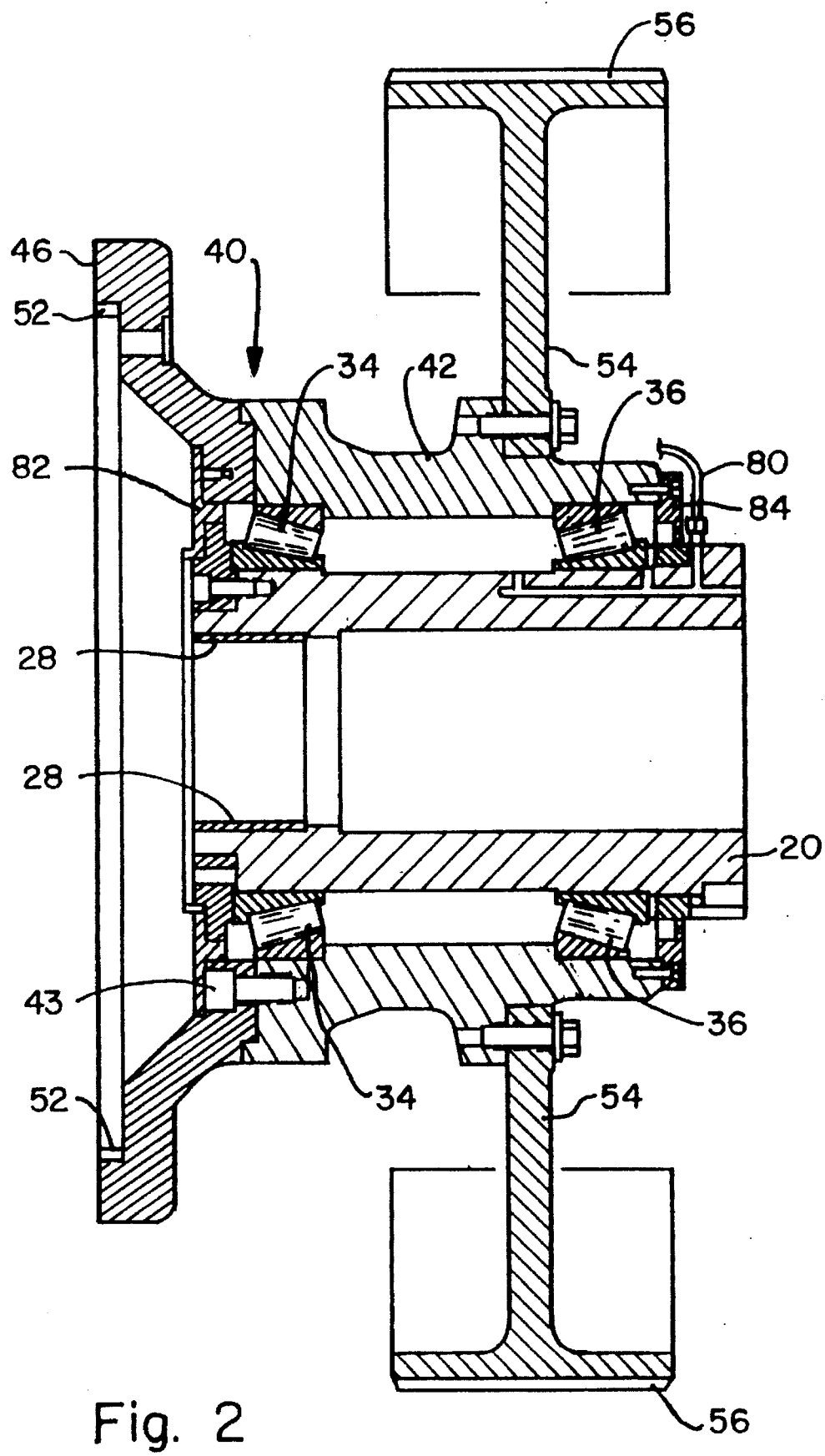
FIG. 2 is a partial sectional detailed view of the outer hollow main shaft of the pelletizer of FIG. 1.

Mounted to the outer surface of the outer shaft 20 are a pair of axially spaced bearings 34, 36. In the preferred embodiment, these are adjustable tapered roller bearings. Tapered roller bearings are preferred because the bearings cant inwardly toward each other to resist lateral motion along the rotation axis of the pelletizer. The outer shaft 20 and bearings 34, 36 are shown in detail in FIG. 2.

Surrounding the shaft mechanism 18 is a die holder 40. The die holder comprises three portions, a substantially tubular main body 42, and two opposed flange sections 44, 46. The main body 42 engages the tapered roller bearings 34, 36 on the radially inside surface of the body. The pelletizing apparatus has means for lubricating the bearings 34, 36. These means are generally shown at 80, 82. In the preferred embodiment, flange 46 is fixed to the die holder main body 42 by bolts 43, and cantilevers farther outward than the end of outer shaft 20. Additionally, the flanges 44, 46 of the die holder are annular and of greater diameter than the die holder main body 42.

A die 48 is mounted on the die holder 40 by bolts 50 disposed between the flanges 44, 46. The die 48 is further retained in proper position by annular die mounts 52, which are held in press fit relation between the die 48 and the flanges 44, 46 by the bolts 50. Also mounted to the die holder is a flywheel 54. A belt 56 rides on the flywheel 54 to transmit power to the die holder from a motor means (not shown). The belt 54 is the preferred means of transmitting power to the die holder 40 because the belt 54 does not require lubrication, therefore reducing maintenance.

The die holder 40 and die 48 further define a pelletizing chamber 58. Inside the pelletizing chamber 58 is a roller frame 60. The roller frame 60 is fixed to the distal end of inner shaft 22. In the preferred embodiment, the roller frame 60 rotatably supports a series of rollers, one of which is shown at 62. The rollers 62 are allowed to rotate by means of a roller bearing 64.

In the roller frame 60 and the die holder flange 44 are material feed openings 66. These openings 66 allow feed material to enter the pelletizing chamber 58 from the hopper 68. During operation of the pelletizing mill 10, feed material, such as conditioned animal feed, is introduced from the hopper 68 into the openings 66 and finally into the pelletizing chamber 58.

Power is applied to the mill by use of flywheel 54 to cause a rotation of the die 48. The rollers 62 are in intimate rolling contact with the inside surface of the die 48. As the die 48 rotates, the die causes rollers 62 to rotate. The mill operates by feed material being trapped between the rollers 62 and the inside surface of the die 48. The trapped feed is then forced through radial slots 70 to the outside surface of the die 48. Then, knives or other means (not shown) scrape the feed material from the outer surface of the die 48 to form feed pellets. The resulting pellets then fall through an opening 72 where they are collected.

Feed material is segregated from the other portions of the pelletizer 10 by use of a cover 74. A sealing mechanism 76 mounted on the die holder 40 further seals feed material from the remainder of the pelletizer. The sealing mechanism 76 and cover serve no weight bearing function.

During operation of the pelletizer, significant weight transfer occurs from the rotating components to the outer shaft 20. The weight of the die 48, die holder 40 and flywheel 54 are transferred through the bearings 34, 36 to the outer shaft 20. Additionally, tension in the belt 56 on the flywheel 54 is transferred through the bearings 34, 36 to the outer shaft 20. The outer shaft also experiences some torque along the axis from the belt rotating the flywheel. Proper adjustment of the bearings 34, 36 minimizes the transferred torque.

The weight of the rollers, roller frame and inner shaft 22 are also transferred to the outer shaft 20. The weight is primarily transferred through the front PTFE-composite bearings 28. A small portion of the weight of the inner shaft, roller frame and rollers can also be transferred directly to the shaft mount and frame by the second PTFE composite bearing 26. Because the outer shaft 20 supports most of the weight of the pelletizer, it can be seen how important the strength of junction is between the outer shaft 20 and the shaft mount 16.

During pelletizer operation, inner shaft 22 experiences torque as a result of the rollers 62 being in rolling contact with the inner face of die 48. Additionally, feed trapped between the die and the rollers caused resistance to rotation and further increases the torque. Most of the axial torque applied by the motor to the die holder by use of the belt and flywheel are transferred to the inner shaft through the die, rollers and roller frame. The shear pins sufficiently resist the axial torque produced to keep the inner shaft from rotating. Should the axial torque on the inner shaft rise above a predetermined amount due to binding of the apparatus, the shear pins will shear, protecting the pelletizer from more significant damage.

Failure of a roller bearing 64, or material becoming caught between the inside surface of the die 48 and the rollers 62, will result in transfer of a large axial torque to the inner shaft 18. Normally, such a result would damage the pelletizing apparatus. However, in the present design, due to the split nature of the main shaft 18, when excess torque is experienced by the inner shaft, shear pins 32 will shear allowing the relative rotation between the inner and outer shafts. This rotation is of a temporary nature to allow the pelletizing apparatus to be stopped and repaired. In many circumstances, only the shear pins need replacement instead of more expensive and more difficult to replace components.

From the above description, the divided functions of the inner and outer shafts are apparent. The outer serves a weight bearing function and the inner shaft serves a torque sensing function. Should binding of the apparatus not be a concern of pelletizer operation, the inner and outer shafts may be permanently fixed relative to one another, not necessitating bearings 26, 28. The inner and outer shafts can also be formed unitary as a single shaft, still allowing employed of a reduced number of bearings.

I claim:

1. A pellet mill comprising:

a main frame;

a hollow outer shaft having a proximal end portion and a distal end portion, said proximal end portion supported by said main frame;

a die housing coaxially located around and rotatably mounted to said outer shaft;

die means extending from said die housing for defining a pelletizing chamber at said distal end portion of said outer shaft, said die means including an annular die;

an inner shaft having a proximal end portion and a distal end portion, said inner shaft coaxially located within said outer shaft;

bushing means for allowing relative rotation between said inner shaft and said outer shaft;

roller frame means fixed to said distal end portion of said inner shaft, said roller frame extending inside said pelletizing chamber for rotatably supporting a roller;

a roller rotatably mounted to said roller frame means and in intimate contact with said annular die; and pin means for preventing relative rotation between said inner shaft and said outer shaft during normal pelletizer operation.

2. The pelletizer of claim 1, wherein said pin means comprises a shear pin, said shear pin allowing relative rotation between said inner shaft and said outer shaft by shearing when said inner shaft experiences torque greater than a predetermined limit.

3. The pelletizer of claim 1, wherein said bushing means comprise static journal bearings.

4. The pelletizer of claim 1, wherein said bushing means comprise PTFE-composite bushings.

5. The pelletizer of claim 1, wherein said die housing is rotatably mounted to said outer shaft by tapered roller bearings.

6. A pellet mill comprising:

a main frame;

a hollow outer shaft having a proximal end portion and a distal end portion, said proximal end portion cantilevered from said main frame;

a die housing coaxially located around said outer shaft;

first bearing means for allowing relative rotation between said outer shaft and said die housing;

an annular die means mounted to said die housing for defining a pelletizing chamber;

an inner shaft having a proximal end portion and a distal end portion, said inner shaft coaxially located within said outer shaft;

a roller frame fixed to said distal end portion of said inner shaft, and inside said pelletizing chamber;

a roller rotatably mounted to said roller frame and in intimate contact with said annular die means;

fixing means for preventing relative rotation between said inner shaft and said outer shaft during normal pelletizer operation; and second bearing means for relative rotation between said inner shaft and said outer shaft, and for transferring substantially all of the weight of said inner shaft, said roller frame and said roller to said outer shaft.

7. The pelletizer of claim 6, wherein said fixing means comprises a shear pin, said shear pin allowing relative rotation between said inner shaft and said outer shaft by shearing when said inner shaft experiences torque greater than a preset limit.

8. The pelletizer of claim 6, wherein said second bearing means comprise static journal bearings.

9. The pelletizer of claim 6, wherein said second bearing means comprise PTFE-composite bushings.

10. The pelletizer of claim 6, wherein said first bearing means comprise tapered roller bearings.

* * * * *